US010262527B2

(12) United States Patent
Benien et al.

(10) Patent No.: US 10,262,527 B2
(45) Date of Patent: Apr. 16, 2019

(54) COMMISSIONING OF REMOTELY MANAGED INTELLIGENT LIGHTING DEVICES

(71) Applicant: SIGNIFY HOLDING B.V., Eindhoven (NL)

(72) Inventors: Christian Benien, Eindhoven (NL); Marinus Jan De Putter, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/127,805

(22) PCT Filed: Mar. 10, 2015

(86) PCT No.: PCT/EP2015/054911
§ 371 (c)(1),
(2) Date: Sep. 21, 2016

(87) PCT Pub. No.: WO2015/140000
PCT Pub. Date: Sep. 24, 2015

(65) Prior Publication Data
US 2017/0124856 A1 May 4, 2017

(30) Foreign Application Priority Data
Mar. 21, 2014 (EP) .................................. 14161137

(51) Int. Cl.
G08C 17/02 (2006.01)
H05B 37/02 (2006.01)
(Continued)

(52) U.S. Cl.
CPC .............. *G08C 17/02* (2013.01); *G01S 19/13* (2013.01); *H04B 1/3816* (2013.01);
(Continued)

(58) Field of Classification Search
CPC ....... G08C 17/02; G01S 19/13; H04B 1/3816; H04W 8/186; H04W 12/06; H05B 33/0854; H05B 37/0272; H05B 37/0227
(Continued)

(56) References Cited

U.S. PATENT DOCUMENTS 5,595,440 A    1/1997 Gordin et al.
2004/0019564 A1*  1/2004 Goldthwaite .......... G06Q 20/04
                                                    705/44
(Continued)

FOREIGN PATENT DOCUMENTS

CN    101965082 A    2/2011
EP    2369899 A1    9/2011
(Continued)

OTHER PUBLICATIONS

M. Popa, et al., "Energy Consumption Saving Solutions Based on Intelligent Street Lighting Control System", U.P.B. Sci. Bull., Series C, vol. 73, Iss. 4, 2011, pp. 297-308.
(Continued)

Primary Examiner — Kamran Afshar
Assistant Examiner — Farid Seyedvosoghi
(74) Attorney, Agent, or Firm — Akarsh Belagodu

(57) ABSTRACT

An apparatus, method and computer program for performing an at least partially automated commissioning of a lighting device at installation. The apparatus comprises: a wireless interface for communicating over a pre-existing public wireless network, pre-existing at said installation; a positioning module for determining a location of the lighting device; and a local control module. As part of said commissioning, the local control module determines the location of the lighting device using the positioning module, and transmits commissioning information to a register of a lighting management system by transmitting the commissioning information over
(Continued)

the pre-existing public wireless network via the wireless interface. The commissioning information comprises an identifier of the apparatus along with the location of the lighting device as determined using the positioning system.

14 Claims, 2 Drawing Sheets

(51) Int. Cl.
| | | |
|---|---|---|
| *G01S 19/13* | (2010.01) | |
| *H04B 1/3816* | (2015.01) | |
| *H04W 8/18* | (2009.01) | |
| *H04W 12/06* | (2009.01) | |
| *H05B 33/08* | (2006.01) | |
| *F21S 2/00* | (2016.01) | |
| *F21S 8/08* | (2006.01) | |
| *F21W 131/103* | (2006.01) | |
| *H04W 84/12* | (2009.01) | |

(52) U.S. Cl.
CPC ........... *H04W 8/186* (2013.01); *H04W 12/06* (2013.01); *H05B 33/0854* (2013.01); *H05B 37/0227* (2013.01); *H05B 37/0272* (2013.01); *F21S 2/00* (2013.01); *F21S 8/086* (2013.01); *F21W 2131/103* (2013.01); *H04W 84/12* (2013.01); *Y02B 20/48* (2013.01)

(58) Field of Classification Search
USPC ........................................................ 455/420
See application file for complete search history.

(56) References Cited

U.S. PATENT DOCUMENTS

| | | | |
|---|---|---|---|
| 2008/0218087 A1* | 9/2008 | Crouse ............... | H05B 37/0245 315/131 |
| 2009/0085500 A1* | 4/2009 | Zampini, II ....... | H05B 33/0857 315/297 |
| 2010/0029268 A1 | 2/2010 | Myer et al. | |
| 2011/0095867 A1 | 4/2011 | Ahmad | |
| 2012/0059622 A1* | 3/2012 | Cacace ............. | H05B 37/0272 702/150 |
| 2013/0116003 A1 | 5/2013 | Chhatbar et al. | |
| 2013/0130522 A1* | 5/2013 | Mitchell ............ | H01R 13/6397 439/133 |
| 2013/0132267 A1* | 5/2013 | Moore .................. | G06Q 20/10 705/38 |
| 2013/0181609 A1* | 7/2013 | Agrawal ................ | H05B 37/03 315/131 |
| 2013/0328481 A1* | 12/2013 | Hiroi .................. | H05B 37/0272 315/34 |
| 2014/0023336 A1* | 1/2014 | Mast ..................... | H04N 5/765 386/200 |

FOREIGN PATENT DOCUMENTS

| | | |
|---|---|---|
| GB | 2481721 A | 1/2012 |
| JP | 2012227105 A | 11/2012 |
| KR | 20130131567 A | 12/2013 |
| WO | WO2014009880 A2 | 1/2014 |
| WO | WO2014009888 A1 | 1/2014 |

OTHER PUBLICATIONS

O. Natu, et al., "GSM Based Smart Street Light Monitoring and Control System", International Journal on Computer Science and Enineering (IJCSE), vol. 5, No. 3, Mar. 2013, pp. 187-189.

* cited by examiner

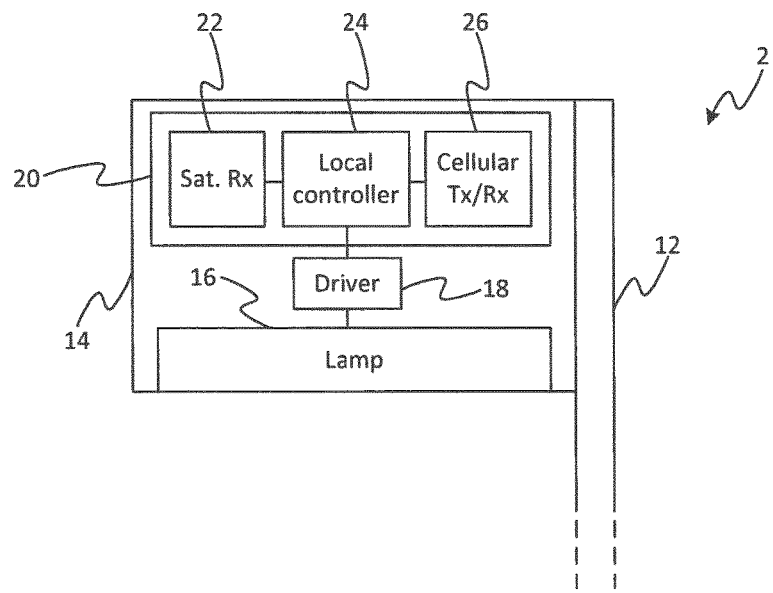
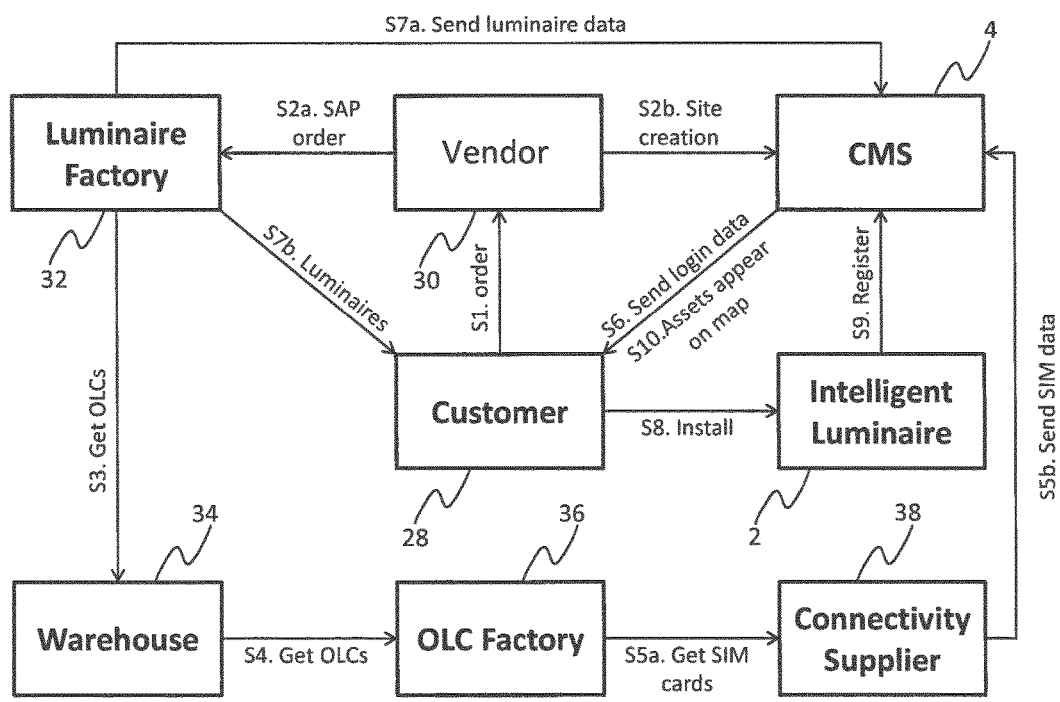

US 10,262,527 B2

COMMISSIONING OF REMOTELY MANAGED INTELLIGENT LIGHTING DEVICES

CROSS-REFERENCE TO PRIOR APPLICATIONS

This application is the U.S. National Phase application under 35 U.S.C. § 371 of International Application No. PCT/EP2015/054911, filed on Mar. 10, 2015, which claims the benefit of European Patent Application No. 14161137.6, filed on Mar. 21, 2014. These applications are hereby incorporated by reference herein.

TECHNICAL FIELD

The present disclosure relates to the process of commissioning lighting devices such as streetlights upon installation.

BACKGROUND

For outdoor applications, lighting devices such as streetlights are typically managed remotely from a remote lighting management system, e.g. comprising a central management system (CMS) and/or asset management system. Currently, such systems all have in common that they require a dedicated local network to be created for the "last-mile" connectivity with the lighting devices. This last-mile network provides a local area network (LAN) connecting a local group of lighting devices installed at some particular site to a wide-area network (WAN) such as the Internet, which connects onwards to the lighting management system so that it can receive reports from the lighting devices and potentially also control them via the last-mile LAN and the WAN. The last-mile network is typically formed either using powerline communications whereby data is modulated into the power supply powering the lighting devices, or else by creating a private wireless network on an unlicensed band.

Either way, part of the installation project is to configure, build and maintain this local network, as well as installation and configuration of an uplink device that bridges the "last-mile" local area network (LAN) with the internet or another wide-area network (WAN).

However, installation and maintenance of the local last-mile networks is complex and requires skilled engineers on site, as well project planning to set up and maintain the networks. Depending on the product, it can also be quite labour intensive. Furthermore, any step that is performed manually will have a certain chance of failing due to the operator making a mistake. Conventionally this requires engineers on site to be provided with special tools and/or a second level of support to help identify and/or correct such mistakes.

For instance, typically the following steps are involved in the installation of a conventional outdoor lighting network.
(a) Surveying LAN network conditions (e.g. powerline or ISM band noise level)
(b) Planning locations for WAN gateways (segment controllers)
(c) Planning rollout to ensure network availability (e.g. start by installing the lighting devices closest to a segment controller, then continue outwards)
(d) Security provisioning
(e) Installing the gateways
(f) Setting up the gateways (WAN access, initial commissioning)
(g) Installing the lighting devices in the planned order
(h) Scanning barcodes to identify the lighting devices
(i) Matching the barcode of each lighting device to its planned location
(j) Selecting a lamp configuration for each lighting device from a catalogue
(k) Verification of the system (to find any manual mistakes or failing hardware)

SUMMARY

It would be desirable to obviate at least one or some of the above steps and/or to provide a tool to automate one or some of the most common steps. Put another way, it would be desirable to provide a lighting device that could be installed more in line with a "plug and play" philosophy. For instance, it would be helpful to replace the steps (i), (j) and/or (k) above with an auto-discovery feature to automatically discover the existence and location of nodes upon installation, and in embodiments also auto-discover the lamp configuration. As another example, step (g), "Install luminaires in planned order", can also be one of the most difficult problems for existing customers. They are used to refurbishing street by street, and not necessarily in an order which is planned based on proximity to the nearest gateway (segment controller). This results in a lot of installations where initially no connectivity is available, or where temporary gateways have to be installed, which increases the complexity even more. Therefore it would be desirable to provide a system in which no particular order of installation is dictated by the network topology.

Hence according to one aspect disclosed herein, there is provided an apparatus adapted to perform an at least partially automated commissioning of a lighting device at installation. The apparatus comprises: a wireless interface configured to communicate over a pre-existing public wireless network, pre-existing at said installation; a positioning module configured to determine a location of the lighting device; and a local control module. The local control module is configured, as part of the commissioning, to determine the location of the lighting device using the positioning module, and also to transmit commissioning information to a register of a lighting management system by transmitting the commissioning information over said pre-existing public wireless network via the wireless interface. This commissioning information comprises an identifier of the apparatus along with the location of the lighting device as determined using the positioning module.

For example the pre-existing public wireless network may be a wireless wide area network (WWAN), for instance comprising one or more mobile cellular networks such as a GSM, UMTS or LTE or WiMAX network. E.g. the public wireless network may be based on a CDMA access technology such as IS-95, CDMA2000 or WCDMA. Alternatively or additionally, the pre-existing public wireless network could comprise one or more wireless local area networks (WLANS) such as a Wi-Fi or ZigBee network. The positioning module may be a satellite-based positioning module comprising a satellite receiver configured to determine said location from a satellite-based positioning system such as GPS, GLONASS or Galileo.

The disclosed arrangement thus provides a "plug & play" commissioning system by making use of an already available public network such as a 2G, 3G or 4G cellular network for the communication involved at least in the initial commissioning, including at least announcing the presence and location of the lighting device to the remote lighting management system in an at least-partially automated manner (e.g. the installer does not have to manually scan barcodes). In preferred embodiments the local controller does this in a completely automated manner upon power-up of the lighting device (though in other embodiments it is not exclude that he or she is prompted to confirm via a user interface before the lighting device reports itself to the remote system). In further embodiments the pre-existing public network may also be used to automatically receive configuration settings from the lighting management system and thereby auto-configure the initial settings of the lighting device. Alternatively or additionally, e.g. where acting as an asset management system, the lighting management system may have received one or more parameters of the lighting devices from the luminaire or lighting device factory (e.g. order information such as one or more technical properties of the luminaire), and may be configured to automatically match up the parameters to the lighting devices based on the identifiers received over the pre-existing public wireless network. The one or more parameters, or information based thereon, can then be automatically displayed to an operator of the lighting management system, e.g. for the purpose of asset management. Again one, some or all of these steps may be completely automated (but alternatively could involve a minimal input such as a confirmation from the user).

Such features advantageously allow the benefits of remote lighting management to be achieved whilst, from the installer's perspective, allowing the installer to work in very much the same way they would have done in the past when no remote management system was involved and each lighting device was instead simply to be installed as an individual, stand-alone unit. For instance by exploiting already existing public networks like 2G, 3G or 4G cellular networks, it is not necessary to create local last-mile networks, at least not as the initial or only means of communication, and steps such as (h), (i) and/or (j) are made easier or obviated by the positioning technology such as a GPS receiver included in each node. Furthermore, as each node communicates individually with the lighting management system via the pre-existing cellular network or the like, in embodiments there need not be any particular prescribed order in which the lighting devices have to be installed.

In embodiments, the transmission over said pre-existing public wireless network is the first communication performed by the local control module upon installation by a given party at a given site, i.e. before communicating externally via any other means.

In further embodiments, the lighting management system may use the identifier received via the public wireless network to look up one or more initial settings of the lighting device. In this case the local control module is configured to receive the initial settings from the lighting management system via the public wireless network, and based thereon to initialize the lighting device with these initial settings.

The local control module may be further configured to continue to control the lighting device during ongoing operation after installation, based on commands from the lighting management system received via said public wireless network—for example to control switching or dimming of the lighting device.

The local control module may be further configured to continue to report further information on the operation of the lighting device during ongoing operation after installation, by transmitting the further information to the lighting management system over said public wireless network—for example to report metering information or faults. In some embodiments, the public wireless network (e.g. 2G or 3G network) is not the only network used, even if that network exclusively is used for the initial communications upon installation. Other networks connecting the lighting devices to one another and/or the lighting management system could be set up at a later time or date. For instance, in one particular embodiment the lighting management system may use the locations received from lighting devices via the public wireless network to create further, local wireless networks between geographical groupings of the lighting devices. In this case the local controller of said lighting device may be configured, in response to transmitting its location to the lighting management system, to join the local wireless network of one of said groups based on a command from the lighting management system received over the public wireless network.

In further embodiments, the apparatus may comprise a subscriber identity module storing a first security data element arranged to be used to authenticate the apparatus to the public wireless network. The subscriber identity module may also store a second security data element arranged to be used to authenticate the apparatus to the lighting management system via the public wireless network. Alternatively the second security data element may be stored on a second subscriber identity module included in the apparatus, or another storage device of the apparatus, e.g. an EEPROM.

In yet further embodiments, the local control module may be configured to control the lighting device according to a default behavior in event that no connectivity with the lighting management system over the public wireless network is achieved. The default behavior may comprise controlling the lighting device based on a timer and/or one or more sensors.

According to another aspect disclosed herein, there is provided a lighting device comprising the apparatus having any of the above features. According to another aspect disclosed herein, there is provided a lighting network comprising the lighting management system and a plurality of lighting devices each comprising an instance of the apparatus having any of the above features.

In embodiments, the lighting management system is configured to use the identifiers received via the public wireless network to look up one or more respective parameters of each lighting device (e.g. order information), for use in the lighting management system (e.g. when comprising an asset management system).

According to yet further aspects of the disclosure, there is provided a corresponding method of commissioning of a lighting device at installation, and a corresponding computer program product for commissioning of a lighting device.

BRIEF DESCRIPTION OF THE DRAWINGS

To assist understanding of the present disclosure and to show how embodiments may be put into effect, reference is made by way of example to the accompanying drawings in which:

FIG. 3 is a schematic block diagram of a light pole in accordance with embodiments of the present disclosure, and FIG. 4 schematically illustrates a method of commissioning light poles in accordance with embodiments of the present disclosure.

DETAILED DESCRIPTION OF EMBODIMENTS

The following describes an arrangement which does not require the creation of local last-mile networks in the implementation of outdoor light poles, at least not as the initial or only means of communication, and instead exploits one or more already-existing public networks such as a 2G, 3G or 4G mobile cellular network for the purpose of commissioning (and optionally also for the purpose of continued control and/or feedback in day-to-day operation of the light poles). To further achieve the desired "plug & play" installation, in embodiments the following steps are performed automatically by the light pole without manual effort of the installer on site.

Security provisioning end-to-end between a luminaire and the remote management system, by way of a dedicated secret embedded in the SIM card used in the luminaire.

Provisioning of technical parameters of the luminaire (electrical, lighting) for use in the remote management system, by sending these up front already from the luminaire factory to the remote management system.

Provisioning of the location (GPS coordinates) of the luminaire, by after powering up sending increasingly more accurate location information to the remote management system.

Figure 1:
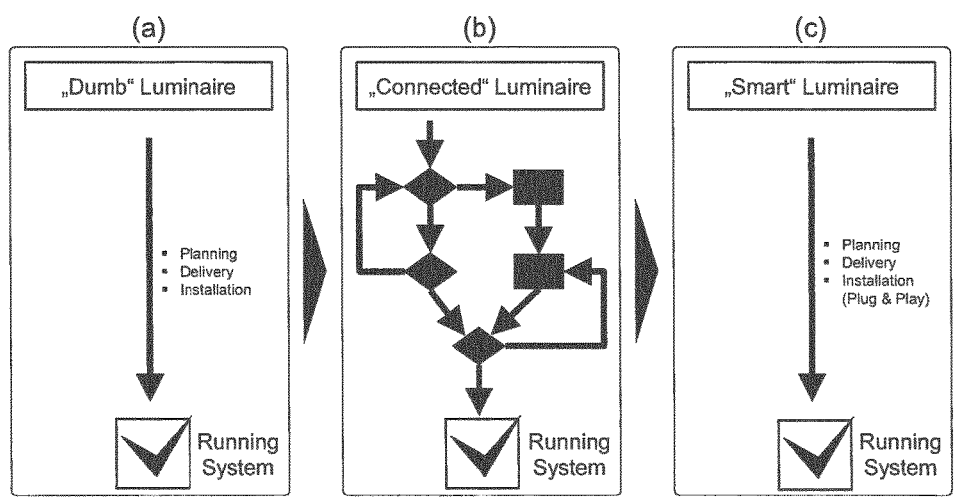
FIG. 1 schematically represents a historical development from prior techniques to a "plug and play" commissioning process in accordance with embodiments of the present disclosure.

FIG. 1 shows conceptually the evolution from traditional "dumb" light poles, to more recent remotely-managed light poles requiring complex installation, to the "plug and play" light poles now disclosed in embodiments of the present disclosure.

FIG. 1(a) represents the installation of an old-fashioned "dumb" light pole. In terms of control, the light pole at most comprises a local timer, light sensor or motion sensor with local control circuit configured to switch its own luminaire on and off at the appropriate times or in response to the appropriate sensing events (turn on when dark or when presence of a being or object is detected). Further, the light pole does not report any information. As a result, each light pole can be installed individually and without requiring creation of any connections elsewhere except simply a connection to the power supply. However, the downside is that the light pole cannot be controlled remotely or report on its status, so it can only be reprogrammed by physically revisiting the site of the light pole, and similarly any faults or current operating information can only be discovered by physically revisiting the light pole.

FIG. 1(b) represents the installation of a more recent "connected" light pole. The light pole is connected to a remote central management system, and so has the advantage that it can be controlled remotely from the management system (e.g. to switch and off and/or dim the light pole according to a desired schedule) and/or can report status information to the remote management system (e.g. to report on faults or current operating conditions). However, the downside is that installation has become much more complex, requiring multiple steps such as steps (a) to (k) outlined above, many of which are time-consuming, require detailed technical expertise, and/or are prone to error. Of these, particularly onerous tasks can include at least the need to commission a dedicated "last mile" network to connect the light poles at the installation site, the need to carefully plan the positions of the light poles, and/or the need to install in a certain order. It would be desirable to obviate one or more of these requirements.

FIG. 1(c) represents the installation of a "smart" light pole in accordance with embodiments disclosed herein. The arrangement can maintain benefits similar to those of a "connected" light pole in terms of the ability to be controlled from a remote system, and/or to transmit reports to such a system. However, the light pole is now configured to connect wirelessly to the central management system via a pre-existing public network such as a 2G, 3G or 4G mobile cellular networks, and to automatically identify itself—including its location—to the remote system via that pre-existing public network upon installation. Hence much of the difficulty involved in the commissioning of previous "connected" light poles can be obviated. In embodiments, the remote system can also continue to control the light pole and/or receive status reports from the light pole via the public wireless network. Alternatively or additionally, in further embodiments the remote system can automatically use the reported ID to set one or more initial settings of the light pole, and/or to match up the light pole with pre-received order information previously received by the system from the factory.

As a result, in embodiments the above list of steps required on site for a fully functioning remote management installation may be reduced to as little as:
(a) Install luminaires (in any order)
(b) Remotely activate the luminaires on the customer's account, thus making them remote-managed
(c) Verification of system (mainly for failing hardware)

In embodiments, the disclosed system enables a workflow which is similar or identical to that which installers would have been familiar with for the last 50 years, but with the added connectivity similar or identical to that of more recent "connected" luminaires. First, the configuration of the luminaires is planned (now using light planning software). The correct luminaire types are ordered and then installed on site. A brief test is made as to whether they work as expected. Depending on the country, the installation is either mains-switched, or always on. For always-on networks, the luminaires contain a photocell to switch the lights off during the day. For testing the correct functioning of a luminaire, a cap is placed on the photocell to see if the luminaire turns on. For mains-switched networks, the whole power segment is switched on, and a check is made on each luminaire to see whether it works as expected.

Figure 2:
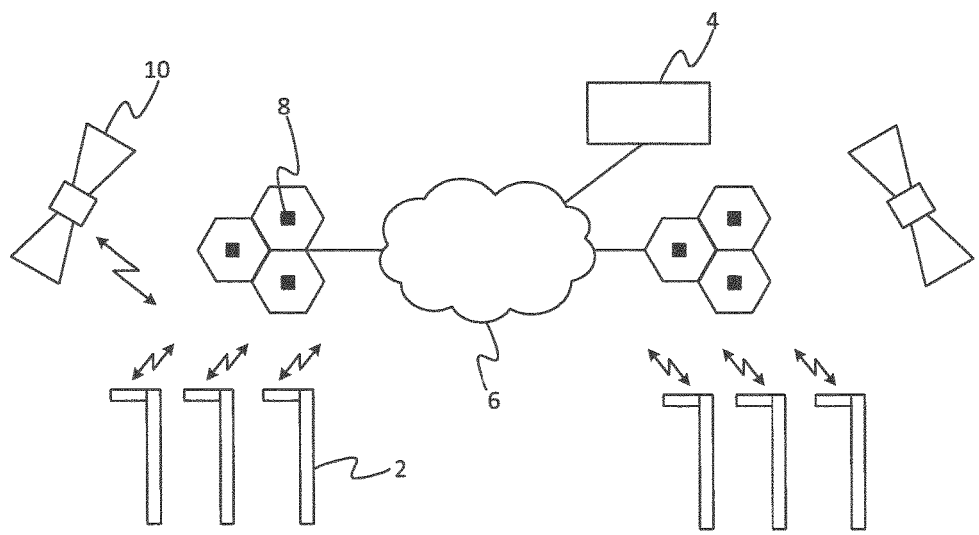
FIG. 2 is a schematic diagram of a lighting network comprising a plurality of light poles public wireless network for use in commissioning the light poles in accordance with embodiments of the present disclosure.

FIG. 2 shows an example lighting network in accordance with embodiments of the present disclosure. The lighting network is an outdoor lighting network comprising a plurality of outdoor light poles 2 such as streetlights which are installed, or to be installed, at various respective locations such as along one or both sides of one or more roads or pathways. The lighting network also comprises a lighting management system 4, e.g. which may comprise functionality of a lighting control system and/or an asset management system. The lighting management system 4 comprises at least one user terminal such as a desktop, laptop or tablet computer, with a lighting management application stored on a storage device of the user terminal and arranged to execute on that user terminal. The lighting management system 4 may also comprise one or more servers hosting the main functionality of the lighting management system 4, which is accessed via the user terminal(s). Alternatively the lighting management system 4 could be a stand-alone application on a given user terminal.

Furthermore, in accordance with techniques disclosed herein, the light poles 2 and lighting management system 4 are each operable to communicate over a public wireless network 6, at least for the purpose of one or more initial commissioning steps to be performed upon installation (and in embodiments also for the purpose of controlling the light poles 2 and/or receiving reports from them in operation after installation). The public wireless network is pre-existing, in that it is already present and providing network coverage in an area before any of the light poles 2 or any associated dedicated equipment have yet been installed in that area. I.e. the pre-existing network 6 already exists in the relevant area for another purpose (e.g. general purpose communications) and is not a dedicated infrastructure relating specifically to the installation or commissioning of the light poles 2.

In embodiments the public wireless network 6 is a wide area wireless network (WWAN) in the form of at least one mobile cellular networks comprising a plurality of base stations 8 (also called "node B" s in 3GPP terminology) of one or more operators, wherein the base stations 8 provide network coverage over different respective geographical cells (which may overlap) based on a radio access technology such as a 2G (e.g. GSM), 3G (e.g. UMTS) or 4G (e.g. LTE) technology, for example comprising a CDMA access technology such as IS-95, CDMA2000 or WCDMA. As another example, the WWAN may comprise base stations of a WiMAX network, or the public wireless network may comprise one or more access points of one or more pre-existing WLANs such as a Wi-Fi or ZigBee network. The following will be described in terms of a WWAN in the form of a mobile cellular network, but it will be understood that other possibilities are not excluded.

Each light pole 2 comprises an interface to the cellular network 6, 8 in the form of a radio transceiver configured to operate according to the relevant radio access technology of the cellular network, and thereby to communicate directly with at least one of the base stations 8 when the light pole 2 is in the cell of that base station. The lighting management system 4 is also arranged to be able to communicate over the cellular network 6, either directly by interfacing with one of the base stations 8 via a cellular transceiver of the lighting management system 4, or indirectly via another network such as the Internet. The lighting management system 4 is thus able to remotely receive information from each of the light poles 2 via the cellular network 6, 8, and in embodiments also to remotely control each of the light poles 2 via the cellular network 6, 8.

FIG. 3 gives a schematic block diagram of a light pole 2 in accordance with embodiments of the present disclosure. The light pole 2 comprises a luminaire 14 mounted on a pole 12, e.g. to illuminate a region beneath the luminaire as in the case of streetlight. The luminaire 14 comprises a lamp 16, e.g. a filament lamp or an LED-based lamp comprising one or more LEDs, and a driver 18 connected to drive the lamp 16. Further, the luminaire 14 comprises apparatus 20 coupled to the lamp 16 for performing an (at least partially) automated commissioning of the light pole 2 upon installation. This apparatus 20 comprises a positioning module 22, a cellular transceiver 26 for connecting to the cellular network 6 via one or more of its base stations 8 (as discussed above), and a local control module 24. In embodiments the apparatus 20 may be referred to as an outdoor lighting controller (OLC).

The positioning module 22 is operable to determine a geographical location of the OLC apparatus 20 (and therefore of the luminaire 14 and light pole 2 in which it is incorporated), i.e. a location relative to the globe or on a map or street plan. In embodiments the positioning module 22 comprises a satellite-based positioning module comprising a satellite receiver and associated algorithm for determining the geographical location of relative to a plurality of satellites of a satellite-based positioning system such as GPS, GLONASS or Galileo. Alternatively or additionally, the positioning module 22 may comprise other means for determining the geographical location, such as an algorithm and suitable receiver for determining the location relative to other reference nodes other than satellites, e.g. relative to the base stations 8 of the cellular network 6 (using the cellular receiver 26), and/or relative to wireless access points of a wireless local access network (WLAN), and/or relative to nodes of a dedicated ground-based positioning system.

The local control module 24 acts as a client to the lighting management system 4, and may be implemented in code stored on a storage device (e.g. ROM, EEPROM or magnetic hard disk) and arranged to execute on a processor, the storage device and processor being incorporated in the light pole 2. This local control module 24 is coupled to the positioning module 22 and cellular transceiver 26. The local control module 24 is thus configured to perform an at-least partially automated commissioning of the light pole 2 by at least: determining the location of the light pole 2 using the positioning module, retrieving an identifier of the light pole 2 from a storage device of the light pole 2 (e.g. ROM, EEPROM or a set of fuse latches, not shown), and reporting the location and identifier of the light pole 2 to a register of the lighting management system 4 via the cellular connection over the cellular network 6 (and any other network involved in connecting onwards from the cellular network 6 to the lighting management system 4, e.g. the Internet). In embodiments the auto-commissioning may also involve downloading one or more initial configuration settings of the light pole 2 from the lighting management system 4, which the lighting management system 4 has looked up for the light pole 2 in question based on the ID it reported.

These steps are at least partially automated in that at least one or some tasks that would previously have been performed manually—such as scanning barcode to identify the light pole 2, manually looking up its pre-planned location, and/or looking up configuration in a catalogue—are no longer required. Preferably no user input is required and the process proceeds in a completely automated manner upon power-up of the light pole 2, in which case it is only required to manually connect the power and mechanically fix the light pole 2 to its desired spot. Alternatively, it is not excluded that some input by a human installer may be involved, e.g. the installer presses a control to instigate the commissioning process or certain steps within the process, or responds to one or more automated prompts to confirm that the process should begin or that certain steps within the process should proceed. For instance such user inputs could be provided through a user interface incorporated into the light pole 2 or via a local connection between the light pole 2 and a mobile terminal of the installer (such as a Wi-Fi or Bluetooth connection between the light pole 2 and an app running on a smart phone or tablet, not shown). E.g. the installer may be prompted for confirmation automatically upon power-up of the light pole 2.

Either way, in embodiments, the communication to announce itself and its location to the lighting management system 4 over the cellular network 6, and to obtain any initial settings from the lighting management system 4, is preferably the first external communication that the light pole 2 performs when first installed by a particular party at a particular site. I.e. the cellular network 6 is the first means of external communication (and may continue to be the only means of external communication, though not necessarily so in all embodiments).

In embodiments, the local control module 24 is also coupled to the lamp 16, being connected to control the lamp 16 via the driver 18, and/or connected to receive status information from the lamp 16 and/or driver 18. This enables the lighting management system 4 to remotely control the lamp 16 of the light pole 2 via the cellular network 6 and local controller 24, and/or to remotely receive status information on the lamp 16 and/or driver 18 via the cellular network 6 and local controller 24.

For the initial commissioning and/or for the continued control and/or reporting, the relevant signaling between the light pole 2 and lighting management system 4 may be conducted over a general purpose packet data channel of the cellular network 6, e.g. using GPRS, EDGE or HSPA; or may be conducted using SMS (over a control channel of the cellular network 6).

Note that the OLC 20 does not necessarily have to contact the main application server of the lighting management system 4 directly, though that is certainly one embodiment. A different embodiment could be to operate a bootstrap server (sometimes called a device management server) which is the initial contact point for a device. This will then make an initial configuration of the OLC to connect to the intended application server.

FIG. 4 illustrates a process of purchasing and commissioning light poles 2 according to embodiments of the present disclosure.

At step S1 a customer 28 places an order with a vendor 30. E.g. the customer could be a city department responsible for street lighting or other outdoor municipal lighting. At step S2a the vendor 30 forwards the order to a luminaire factory 32 that manufactures the luminaires 14 or light poles 2, and at step S2b the vendor 30 informs the lighting management system 4 of the order. At steps S3 the luminaire factory 32 orders the OLCs 20 which are to be incorporated into the light poles 2 from an OLC warehouse 34, and at step S4 the warehouse 36 orders them from an OLC factory 36.

Regarding security provisioning, as part of many cellular networks that may be used (e.g. 2G GSM network), it is mandatory to have a subscriber identity module in the device, often referred to as a "SIM card". Hence to authenticate itself to the cellular network 6 the OLC 20 incorporated in the light pole 2 further comprises a SIM card (not shown). The SIM card already contains a unique identifier and secret data to uniquely authenticate against the HLR (home location register) in the GSM network, or the like. Further, according to embodiments of the present disclosure, for each OLC 20 a second, additional secret is added in the SIM card profile on the SIM card in order to provide end-to-end security between the light pole's local controller 24 and the remote lighting management system 4. The second secret for each OLC 20 is also securely transmitted to the server of the lighting management system 4 whenever a new batch of SIM cards is produced. In operation, the local controller 24 on the OLC 20 will then be able to submit the first secret data to the cellular network 6 in order to authenticate itself to the cellular network, and submit the second secret data to the lighting management system 4 in order to authenticate itself to the lighting management system 4.

For example at step S5 in FIG. 4, the OLC factory 36 orders the SIM cards for the OLCs 20 from a connectivity supplier 38, and the connectivity supplier 38 provides the SIM cards with the secret SIM data for each OLC stored on the respective SIM. This secret SIM data comprises the secret data for authenticating the OLC 20 to the cellular network 6 and the secret data for authenticating to the lighting management system 4. The second secret is unique per instance of the OLC 20, so every luminaire 14 gets its own unique secret which makes the authentication much stronger. At step S5b the connectivity supplier 38 also sends the secret SIM data to the server of the lighting management network 4 (or at least sends it the secret for authenticating the OLC 20 to the lighting management system 4), and these individual secrets are inserted automatically in the system. Alternatively the secrets could be transmitted to the server in any later step during the production, e.g. from the OLC factory 36 or the luminaire factory 32.

In further alternatives, the second secret need not be included on the SIM. A different embodiment could write this secret into an EEPROM manufacturing of the OLC 20, or there could be a second subscriber identity module for this purpose.

At step S6, the server of the lighting management system 4 sends login details to the customer 28, allowing the customer 28 to log in to the lighting management system from a user terminal of the customer, e.g. a desktop, laptop, tablet or even a smartphone of the customer. For example the lighting management system may be configured to allow the customer's user terminal to log in via a packet-based network such as the Internet and/or a company LAN. The customer's user terminal thus becomes a part of the lighting management system, which will allow the customer to control their light poles 2 and/or receive reports from them via the application hosted on the server.

Before that however, after the luminaire 14 or light pole 2 has left the luminaire factory production line, at step S7a information about each produced luminaire 14 or light pole 2 is sent to the server of the lighting management system 4. This may include one or more of the following parameters:

unique identifiers of one or more components, e.g. a service tag of the luminaire 14 or light pole 2, an identifier of the driver 18, and/or an identifier of the OLC's local controller 24;

commercial information, e.g. an 1ONC type of the luminaire 14 or light pole 2 and/or one or more components of it, a commercial designation of the luminaire, and/or customer choices;

logistics information, e.g. a production order number, and/or order number;

one or more technical parameters, e.g. system power, minimum dimming level, system luminous flux, color rendering index, and/or light color; and/or programming information, e.g. how one or more components are programmed in the factory, such as information on pre-programmed dimming behavior, photocell levels, and/or a CLO (constant light output) algorithm (an algorithm that compensates for the aging of an LED as over time they become less efficient). For example parameters of the CLO algorithm may be sent by the lighting management system 4 to the light poles 2.

At step S7b, the light poles 2 or at least the luminaires 14 are delivered to the customer. At step S8 the customer installs the luminaires at the desired locations.

As soon as both the security provisioning is done and the luminaire or light pole data is available in the lighting management system 4, the SIM card for the light pole 2 can be enabled. From that moment on, the local controller 24 is able to connect securely to the lighting system platform 4 when it is first powered on.

After the OLC's local controller is powered, it will try to get a GPS fix as soon as possible. For example this may initially give a location which is accurate up to 20 meters. Soon however more satellites may be found, which increases the quality of the location estimate. The local controller 24 may also be configured to average the location over a longer time (e.g. at least one hour), which can for example increase the accuracy to about 2 meters, and relative to nearby OLCs even to 1 meter. These relative locations are good enough to distinguish between multiple luminaires 14 on the same pole 12, provided they are at least 1 meter apart. Other accuracies and times to obtain a fix may be achieved depending on conditions.

For example, one reason for wanting to know the relative locations of two luminaires on the same light pole this is to distinguish which luminaire is on which side of the road, e.g. which one is north and which one is south. I.e. if the two luminaires can be distinguished as being at distinct positions on the light pole (e.g. one on an arm extending one direction and another on an arm extending on the opposite direction), it is also possible to determine their relative orientation. This information enables a maintenance or repair team block the right lane for repair.

There may be at least two alternative variants of the auto location. According to the first, the customer does not have data and trusts the OLC 20 to determine it using the positioning module 22, as discussed above. The degree of accuracy could also be made visible to the customer. Alternatively however, in the second variant, the customer has asset data and wants the OLCs 20 to be assigned to this data. In this case, a warning is shown when a user moves the asset to a location which is more than a certain threshold, e.g. 5*m*, away from the desired location. The system may be configured to support either or both of these variants.

The location, together with logistics information from the luminaire factory allows an OLC 20 to be uniquely associated in the lighting management system 4 with a customer site. In other systems this is solved implicitly by logging in to the correct customer site before starting by means of manual configuration steps. An alternative solution would be to program the OLC in the luminaire factory with the correct customer site details. However, this would be less flexible, and the customer would have to make a choice already at the time of the luminaire order. Instead therefore, in embodiments of the present disclosure, this is solved differently: at step S9 the OLC 20 automatically registers itself by announcing its ID and its self-determined geographic location to the server of the lighting management system 4, via the pre-existing cellular network 6.

At step S10, the installed and commissioned light poles 2 then appear to the customer 28 through the lighting management system 4. The lighting management system is configured to automatically match up the respective technical parameters received at step S7a with the ID of each respective luminaire 14 as received at step S9. The properties of each luminaire thus automatically appear to the operator of the lighting management system 4 upon installation, rather than the operator needing to manually enter the luminaire properties into the system.

In embodiments, the auto-commissioning may also comprise the lighting management system 4 sending configuration information to the light pole 2 via the cellular network, with which the OLC's local controller 24 configures the light pole 2. For example a dimming or switching calendar for the light pole 2 may be automatically downloaded as soon as connection exists with the lighting management system 4, specifying what times of day the lamp 16 of the light pole's luminaire 14 is to be switched on and off, or how its dimming level is to vary with time of day. As another example, the light pole 2 may comprise one or more sensors (not shown) based upon which its local controller 24 is to automatically switch or dim the lamp 16 of the luminaire 14. For example, the light pole 2 may comprise a presence sensor (e.g. motion sensor) which will automatically trigger the lamp 16 to come on or dim up when a being or object is sensed to be present within a certain vicinity of the sensor. As another example, the light pole may comprise a light sensor which will automatically trigger the light source to come on or dim up in response to detecting that the current ambient light level is below a certain threshold. In such embodiments, the initial configuration information downloaded from the lighting may comprise a definition of the conditions under which the sensor(s) will trigger the lamp 16 to switch on and off, and/or dim up and down. E.g. the definition may comprise a sensor sensitivity level or threshold for the one or more sensors.

As mentioned, after the initial installation and auto-commissioning, in embodiments the local controller 24 may also be configured to continue to control the luminaire 14 during ongoing operation based on instructions from the lighting management system 4 received over the cellular network 6. In embodiments, this ongoing control of the luminaire 14 by the remote lighting management system 4 may comprise one or more of:

dimming and switching the lamp 16;
configuring or reconfiguring the dimming calendar;
switching on and off the photo sensor and/or motion sensor;
configuring or reconfiguring the behavior in response to one or more of the sensors;
switching on and off the mains network;
manual override from calendar and/or sensor based behavior, optionally with a reset time (a period of time set by customer after which the luminaire switches back to standard calendar and/or sensor based behavior settings) or conversely a valid window and/or start time defining when the manual override is effective;
configuration of the reporting (see below), i.e. when and/or on what condition information is reported from the OLC 20 to the lighting management system 4; and/or
color of the light emitted by the lamp 16, for example expressed as a color temperature (e.g. in Kelvin).

In embodiments, the OLC's local controller 24 may be configured with a certain default behavior to use in event that no connectivity with the lighting management system 4 is achieved. For example the local controller 24 may automatically operate the lamp 16 based on the local motion sensor and/or photo cell when connectivity is not achieved.

Alternatively or additionally to the ongoing control, after the initial installation and auto-commissioning, in embodiments the local controller 24 may be configured to continue to send reports of the luminaire's status to the lighting management system 4 over the cellular network 6. In embodiments, this ongoing reporting may comprise one or more of:

measurement or metering of energy, power, voltage, current, intensity and/or one or more other parameters (these could be current immediate measurements, or logged past values, or measurements accumulated over a period, e.g. an average);
failure detection & reporting, e.g. to report a "day burner" (on in day when should be off), a "night outage" (off at night when should be on), the end of lamp life, and/or the temperature of the luminaire's power box, LED module or driver 18;

where the fault is occurring geographically (e.g. GPS coordinates), and/or the nature of the fault (the lighting management system 4 may then also inform the customer what needs to be done, how often is it happening, and/or whether the same fault(s) are occurring in same street or area);

sensor readings (e.g. of the motion sensor and/or motion sensor); and/or continued reporting of location and/or the accuracy of the reported location.

The reports may be periodic, or triggered by an event, or requested by the lighting management system 4 (e.g. requested over the cellular network 6). For example in embodiments the OLC controllers 24 may continually report their GPS location to the lighting management system; or may report their location only if the accuracy is better than a previous location report, or the location is significantly different from previous location report.

The above has described a lighting network in which light poles 2 can be commissioned and optionally also managed via a pre-existing public wireless network such as a wide area mobile cellular network 6, obviating the requirement for a dedicated "last mile" network to connect local groups of light poles 2, at least for the purpose of the initial commissioning. Note however that in some embodiments, local networks can still be created subsequently, either to enable new applications (e.g. local sensor control) or to reduce connectivity costs. Nonetheless, unlike local networks that are created for other management systems is that, the OLC will always have a cellular (e.g. GPRS) link in addition to the local network. The initial communication will always use the cellular connection, and then in embodiments the server of the lighting management system 4 can coordinate and set up local networks (SDN, software defined networks) between light poles. For instance once a number of light poles 2 have reported their geographic location, the lighting management system 4 may use this information to identify groups of light poles 2 that are close to one another, and control the local controllers 24 to form a wireless local area network (WLAN) between them (using a local wireless transceiver which may be incorporated in each light pole, not shown). E.g. the local network could be used to share sensor data from motion sensors on one or more of the light poles 2, so that if a being or object is sensed by one light pole 2 then one or more others of the same group can turn on or dim up in response as well.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus adapted to perform an at least partially automated commissioning of a lighting device at installation, comprising:
    a wireless interface configured to communicate over a pre-existing public wireless network, pre-existing at said installation;
    a positioning module configured to determine a location of the lighting device;
    a local control module disposed within the lighting device and executing code stored on a storage device incorporated in the lighting device, as part of said commissioning, to determine the location of the lighting device using the positioning module, to automatically retrieve an identifier of the lighting device, and to transmit commissioning information to a register of a lighting management system by transmitting the commissioning information over said pre-existing public wireless network via said wireless interface, the commissioning information comprising the identifier of the lighting device along with the location of the lighting device as determined using said positioning module; and
    a subscriber identity module in the lighting device for storing a first security data element arranged to be used to authenticate the apparatus to the public wireless network,
    a unique identity module in the lighting device for storing a second security data element arranged to be used to authenticate the apparatus to the lighting management system,
    wherein the transmission of the commissioning information over said pre-existing public wireless network is the first communication performed by the local control module upon installation by a given user at a given site, before communicating externally via any other means.

2. The apparatus of claim 1, wherein the lighting management system uses the identifier received via the public wireless network to look up one or more initial settings of the lighting device, and the local control module is configured to receive the initial settings from the lighting management system via the public wireless network and based thereon to initialize the lighting device with said initial settings.

3. The apparatus of claim 1, wherein the local control module is further configured to continue to control the lighting device after installation, based on commands from the lighting management system received via said public wireless network.

4. The apparatus of claim 1, wherein the local control module is further configured to continue to report further information on the operation of the lighting device after installation, by transmitting the further information to the lighting management system over said public wireless network.

5. The apparatus of claim 1, wherein the lighting management system uses locations received from lighting devices via the public wireless network to create further, local wireless networks between geographical groupings of the lighting devices; and wherein the local controller of said lighting device is configured, in response to transmitting its location to the lighting management system, to join the local wireless network of one of said groups based on a command from the lighting management system received over the public wireless network.

6. The apparatus of claim 1, wherein the pre-existing public wireless network is a mobile cellular network, said interface being an interface to the mobile cellular network and the local control module being configured to transmit said location to the lighting management system over the mobile cellular network.

7. The apparatus of claim 1, wherein the positioning module is a satellite based positioning module comprising a satellite receiver configured to determine said location from a satellite based positioning system, the local control module being configured to determine said location using said satellite based positioning module.

8. The apparatus of claim 1, wherein the apparatus further comprises a second security data element arranged to be used to authenticate the apparatus to the lighting management system via the public wireless network; the second security data element being stored on said subscriber identity module, a second subscriber identity module of the apparatus, or on another storage device of the apparatus.

9. The apparatus of claim 1, wherein the local control module is configured to control the lighting device according to a default behavior in event that no connectivity with the lighting management system over the public wireless network is achieved, the default behavior comprising controlling the lighting device based on a timer and/or one or more sensors.

10. A lighting network comprising:
a plurality of lighting devices each comprising an apparatus in accordance with claim 1, and
the lighting management system, being configured to register the location of each lighting device based on the received commissioning information.

11. The lighting network of claim 10, wherein the lighting management system is configured to use the identifiers received via the public wireless network to look up one or more respective parameters of each lighting device for use in the lighting management system.

12. The lighting network of claim 10, wherein:
at least one of the lighting devices comprises two luminaires on the same pole arranged to illuminate different respective lanes of a road, each of the luminaires comprising a respective instance of said apparatus; and
the lighting management system is configured to use the location reported by each of instances of said apparatus to distinguish between the luminaires on the same lighting device, and thereby determine a relative orientation of the luminaires for determine which lane of the road to close for maintenance or repair.

13. A method of commissioning of a lighting device at installation, the method comprising:
authenticating the lighting device to a public wireless network by using a subscriber identity module in the lighting device;
authenticating the lighting device to a lighting management system by using a unique identity module in the lighting device;
determining a location of the lighting device using a positioning system;
automatically retrieving an identifier of the lighting device from a storage device incorporated in the lighting device; and
as part of said commissioning, automatically transmitting commissioning information to a register of the lighting management system by transmitting the commissioning information over a pre-existing public wireless network, pre-existing at said installation, wherein the commissioning information comprises the identifier of the lighting device along with the location of the lighting device as determined using said positioning system,
wherein the transmission of the commissioning information over said pre-existing public wireless network is the first communication performed by the local control module upon installation by a given user at a given site, before communicating externally via any other means.

14. A non-transitory computer readable medium for performing an at least partially automated commissioning of a lighting device at installation, the non-transitory computer readable medium comprising code and configured so as when executed on a local controller of a lighting device to perform operations of:
authenticating the lighting device to a public wireless network by using a subscriber identity module in the lighting device;
authenticating the lighting device to a lighting management system by using a unique identity module in the lighting device;
determining a location of the lighting device using a positioning system;
automatically retrieving an identifier of the lighting device from a storage device incorporated in the lighting device; and
as part of said commissioning, transmitting commissioning information to a register of the lighting management system by transmitting the commissioning information over a pre-existing public wireless network, pre-existing at said installation, wherein the commissioning information comprises the identifier of the lighting device along with the location of the lighting device as determined using said positioning system,
wherein the transmission of the commissioning information over said pre-existing public wireless network is the first communication performed by the local control module upon installation by a given user at a given site, before communicating externally via any other means.

* * * * *